A. S. CORNELL.
Churn.
No. 26,093.
Patented Nov. 15, 1859.
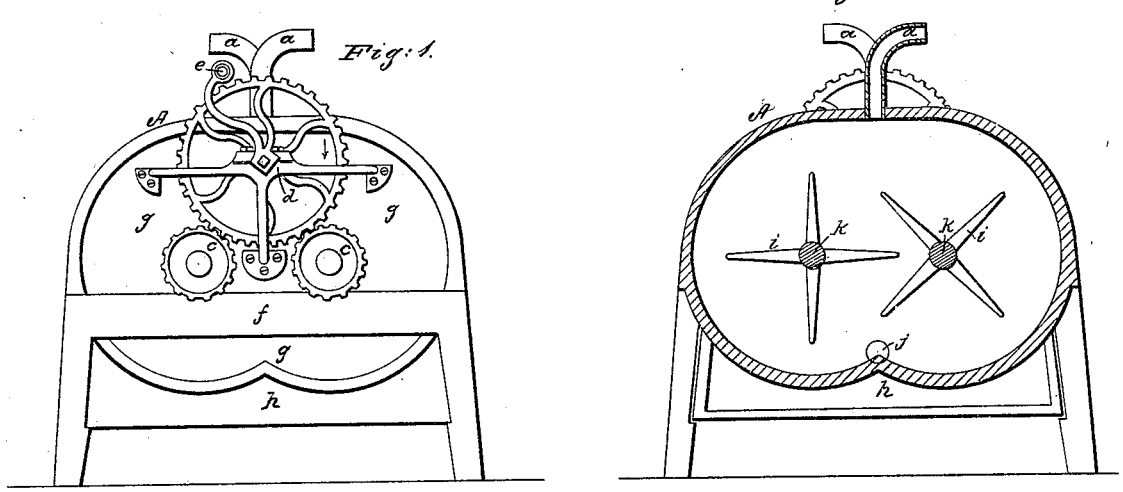
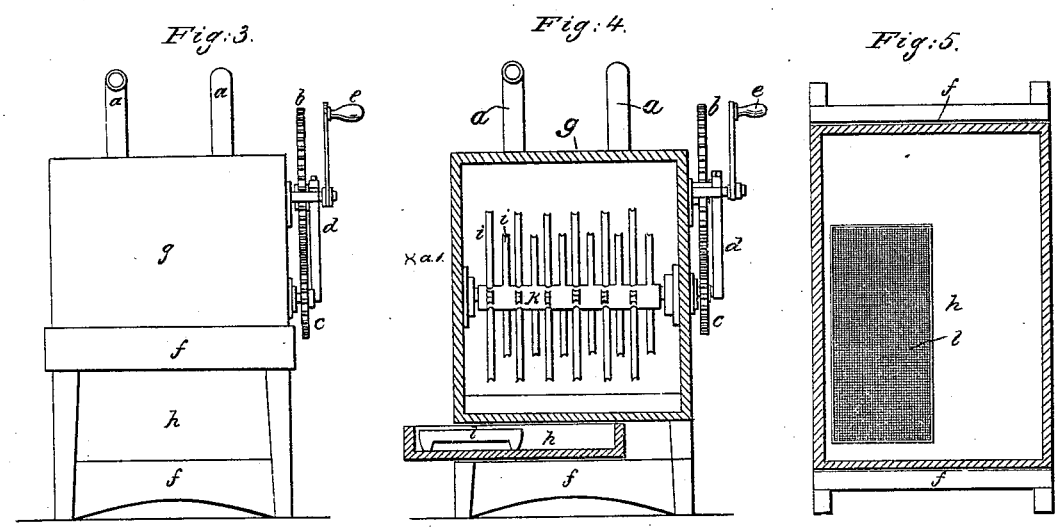
Witnesses:
J. F. Barnes
S. D. Law
Inventor:
Aaron S. Cornell.

UNITED STATES PATENT OFFICE.

AARON S. CORNELL, OF NEW YORK, N. Y.

ROTARY CHURN.

Specification of Letters Patent No. 26,093, dated November 15, 1859.

*To all whom it may concern:*

Be it known that I, AARON S. CORNELL, of the city and State of New York, have invented a new and Improved Churn, which from its construction and mode of operation I call a "Double Rotary Crag Churn;" and I do hereby declare that the following is a full, clear, and exact description thereof and of its construction and mode or manner of operation, reference being had to the accompanying drawings, and to the letters of reference marked thereon, making a part of this specification.

Figure 1 is an end view showing the gearing. Fig. 2 is a sectional view of the end opposite of that shown in Fig. 1, showing the double dashers. Fig. 3 is a side view. Fig. 4 is a sectional view through one of the dashers. Fig. 5 shows the draw under the churn and the gathering sieve in it.

The churn, which is supported on the frame or stand $f$, is of a curved or cylindrical form at its sides, and its bottom is in the form of a double concave, or two cylinders, in which the rotary arms or crags shown in Fig. 2, revolve. The cap or cover A, is also made, on its inside, in a like form of a double concave.

The driving wheel $b$, which is revolved by the crank 1, gears with and gives motion to the two pinions $c$, $c$, which are attached to the two shafts K, K, Fig. 2 which carry the arms or crags, $i$. As these pinions $c$, $c$, are both driven by the common wheel $b$, such pinions and their shafts will have rotary motion in the same direction so that as the arms on one shaft go down, those on the other shaft will pass upward, and the arms or dashers will thus be continually passing each other, giving the most complete and perfect agitation to the milk in the churn. Each shaft K, carries two sets of arms or dashers, $i$, placed at right angles with each other, and separated from each other about the width of such arms, and such arms are so placed upon the two shafts, that the arms on one shaft will pass, as the shafts are revolved, between the arms on the other shaft. The arms or crags $i$, $i$, are thus prevented from interfering with each other, while they effect or produce a constant uniform agitation of the milk.

The arms or crags $i$, $i$, are made of galvanized iron or metal and consist each of two hollow half cylinders or concaves, slightly tapering toward the ends, and placed together at their convex surfaces, so that each arm has four cutting edges or blades to act upon, and most effectually stir and cut up and separate the cream and forming butter. An end or sectional view of any one of such arms is shown at $a^1$, at the side of Fig. 4. Fig. 4, shows one shaft, with one set of its arms standing perpendicular, the other being horizontal, and the ends only of which are seen.

J represents the discharge orifice, or faucet, by which the buttermilk is drawn from the butter, as required.

H is a draw or cistern underneath the churn, to receive the buttermilk when drawn from the churn. Within this draw is the gathering sieve or strainer $l$, which is designed to catch and retain any particles of butter, which may pass off with the buttermilk drawn from the churn. By shaking or agitating this sieve with the hands all such particles of butter will easily be gathered and can be transferred back to the churn, or to the working bowl.

The pinions $c$, $c$, screw into female screws in the shafts K, K, with left handed screws, so that such screws are kept constantly tight, while the driving wheel is turned in the direction indicated by the arrow: but when it is desired to remove the rotating arms or dashers for cleaning the churn, &c., it is only necessary to hold the arms with one hand, and turn the driving wheel in the opposite direction, when the pinions $c$, $c$, will be unscrewed, and can be removed and the rotating shafts can be easily lifted and cleaned. Instead, however, of such screw, the shaft carrying the arms $i$, $i$, may slide, with a dovetail, down over the pinion axle, and the dasher shaft can then be removed by simply lifting it up.

In the top or cover A, are inserted air pipes $a$, $a$, to prevent the milk becoming too much heated while being churned.

What I claim as my invention is—

The arrangement of the rotating shafts armed with the concave or recessed crags or dashers within the two concave or half cylinder chambers placed back to back as herein described.

AARON S. CORNELL.

Witnesses:
E. F. BARNES,
S. D. LAW.